United States Patent [19]
Plfeger

[11] Patent Number: 5,408,789
[45] Date of Patent: Apr. 25, 1995

[54] OVERHEAD SECURITY DOOR

[75] Inventor: Robert H. Plfeger, Milwaukee, Wis.

[73] Assignee: Pflow Industries, Milwaukee, Wis.

[21] Appl. No.: 164,208

[22] Filed: Dec. 9, 1993

[51] Int. Cl.⁶ .......................................... E04H 14/00
[52] U.S. Cl. ................... 52/173.2; 160/113; 160/209
[58] Field of Search ............... 160/113, 118, 119, 201, 160/209; 49/61, 63; 52/71, 173.2, 645

[56] References Cited

U.S. PATENT DOCUMENTS

| | | | |
|---|---|---|---|
| 2,072,092 | 3/1937 | Blodgett | 160/113 |
| 3,021,896 | 2/1962 | Buono et al. | 160/113 |
| 3,103,967 | 9/1963 | Gaschen | 160/113 |
| 4,280,685 | 7/1981 | St. Angelo | 256/1 |
| 4,356,668 | 11/1982 | Wagner | 160/113 X |
| 4,653,566 | 3/1987 | Miale | 160/113 X |
| 5,050,660 | 9/1991 | Bleichwehl et al. | 160/113 |

*Primary Examiner*—David M. Purol
*Attorney, Agent, or Firm*—Andrus, Sceales, Starke & Sawall

[57] ABSTRACT

A security door construction for a doorway in a loading dock. The door is constructed of open materials, such as expanded metal mesh, and is mounted for movement between a closed and open position on tracks which are located adjacent the sides of the doorway. A safety beam or barrier is connected to the lower portion of the door and extends across the width of the doorway when the door is in the closed position. Fixed supports are mounted on the loading dock in position to be engaged by the ends of the barrier in the event the barrier is subjected to an impact, thereby preventing lateral deflection of the door by the external force and preventing heavy objects from falling through the doorway.

15 Claims, 1 Drawing Sheet

OVERHEAD SECURITY DOOR

BACKGROUND OF THE INVENTION

A typical loading dock includes one or more dock openings or doorways each enclosed by an overhead door. In many cases, a dock leveler is mounted in a pit in the loading dock in front of the doorway and operation of the dock leveler will serve to bridge the gap between the loading dock and a truck parked in front of the dock so that personnel and material handling equipment, such as a forklift truck, can conveniently move between the loading dock and the truck bed.

During a loading operation the truck body will enclose the doorway in the dock, but when a loading dock operation is not taking place, it is often desired to maintain the overhead door in an open position to provide increased ventilation or light in the building or to vent smoke, fumes or odors from the building. With the overhead door in the open position, there is a problem of unauthorized personnel entering the building as well as articles being passed through the opening by pilferage.

Another problem that arises when the overhead door is open is that there is a possibility that material equipment, such as a forklift truck, maneuvering on the dock may accidentally back through the open doorway and fall to the driveway, thus causing possible injury to personnel or damage to the equipment.

SUMMARY OF THE INVENTION

The invention is directed to a security door for a loading dock that is composed a material that is permeable to light and/or air and incorporates a safety barrier to prevent equipment, such as a forklift truck, from accidentally breaking through the security door and falling to the driveway beneath the dock.

In accordance with the invention, the security door is preferably formed of a series of hinged rectangular sections each composed of an open material such as expanded metal, link chain or the like. The door sections are mounted for travel on a pair of tracks, each mounted adjacent each a side of the doorway and the door is movable, either manually or through mechanical means, between a closed position and an open position. The tracks for the security door are mounted parallel to and adjacent the tracks for the conventional overhead door.

A safety beam or barrier is mounted on one of the lowermost sections of the security door and extends across the width of the doorway. When the security door is in the closed position, the ends of the safety barrier are located inwardly of a pair of rigid supports or columns that are mounted on the loading dock.

If the barrier is subjected to a force or impact, such as by a forklift truck accidentally backing into the barrier, the ends of the barrier will engage the fixed supports, thus preventing deflection of the security door and preventing the forklift truck from falling through the doorway to the driveway beneath the dock.

The security door can be locked in the closed position, thereby providing security for the building and preventing personnel or articles from passing through the doorway.

As the door is preferably formed of an open material, the lighting in the building is improved and smoke, fumes or odors are readily vented through the security door to the exterior.

The safety barrier which is integrally formed with the security door prevents equipment from accidentally falling through the open doorway to the driveway beneath and also will act to minimize damage to the security door itself.

The security door is preferably used in combination with a standard overhead door and requires little added space for operation. The security door can either be mounted on the interior or exterior of the building.

Other objects and advantages will appear during the course of the following description.

DESCRIPTION OF THE DRAWINGS

The drawings illustrate the best mode presently contemplated in carrying out the invention.

DESCRIPTION OF THE ILLUSTRATED EMBODIMENT

Figure 1:
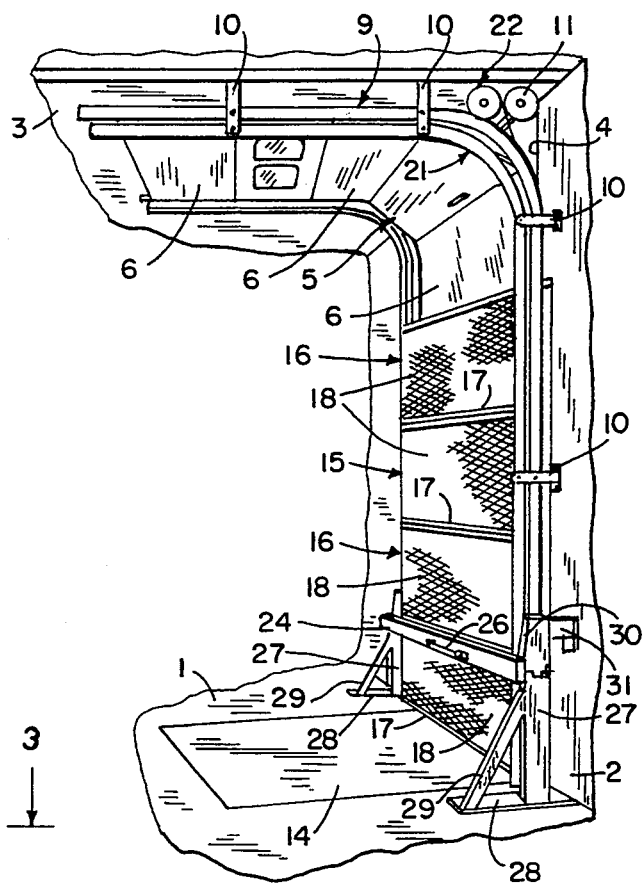
FIG. 1 is a perspective view of a portion of a loading dock incorporating the security door of the invention.

FIG. 1 illustrates a typical loading dock incorporating the security door of the invention. The loading dock includes a floor 1, a vertical wall 2 and a ceiling 3. Wall 2 is formed with one or more doorways or loading openings 4, each of which is enclosed by a standard overhead door 5.

Overhead door 5 is composed of a series of hinged, generally rectangular panels 6 and the door is movable between a closed position, where the door encloses opening 4, and an open position where the door is located adjacent the ceiling 3, as shown in FIG. 1.

To mount door 5 for movement between the closed and open positions, shafts 7 projects outwardly from the side edges of each panel 6 and carry rollers 8 that ride in track 9. As shown in FIG. 1, track 9 is generally L-shaped, including a vertical section and a horizontal section and serves as a guide in moving the door between the closed and open positions. Track 9 is supported from wall 2 and ceiling 3 by a series of brackets 10.

Door 5 can be moved to the open position either manually or through a standard mechanical drive, not shown.

To partially counterbalance the weight of door 5, a torsion spring assembly 11 is mounted adjacent wall 2 above the doorway 4 and a cable 12 connects the torsion spring with the lower end of door 5. Torsion spring assembly 11 operates in a conventional manner to exert an upward force that partially counterbalances the weight of the door to facilitate moving the door from the closed to the open position.

Torsion spring assembly 11 is supported from the wall 2 by a pair of arms or brackets 13.

The typical loading dock may also include a dock leveler 14 which is mounted in a pit in floor 1 of the dock. Dock leveler 14 includes a hinged lip, not shown, which can be extended to engage the bed of a truck parked in front of the loading dock, thereby bridging the gap between the loading dock and the truck bed to facilitate movement of cargo and equipment between the dock and the truck bed.

In accordance with the invention, a security door 15 is mounted adjacent and parallel to the overhead door 5.

Security door 15 includes a series of panels 16 which are hinged together along adjacent edges and each panel 16 is composed of a rectangular frame 17 that supports a sheet of material 18 of open construction, such as expanded metal, chain link, wire fencing, or the like.

Extending outwardly from the side edge of each frame 17 are shafts 19 which carry rollers 20, and the rollers are mounted to ride on a track 21 which is supported by brackets 10 and is parallel to the overhead door track 9. As shown in FIG. 1, track 21 is generally L-shaped including a vertical section that extends along wall 2 and a horizontal section which is supported from ceiling 3.

To counterbalance a portion of the weight of security door 15, a torsion spring assembly 22 is mounted above the doorway 4 and is supported by arms 13. A cable 23 connects the torsion spring assembly 22 to the lower end of the security door 15. The force of torsion spring aids in partially counterbalancing the weight of door 15 to facilitate moving the door from the closed to the open position.

Figure 3:
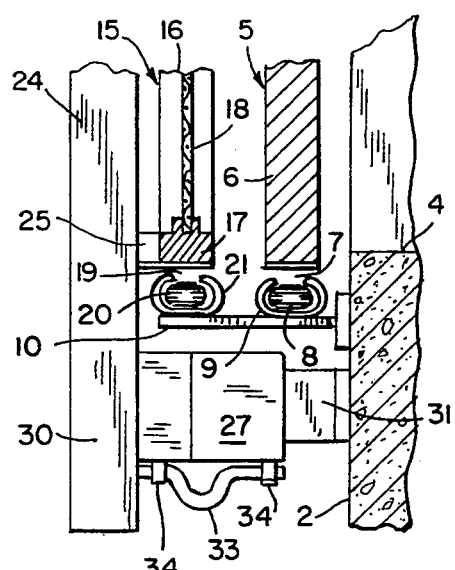
FIG. 3 is a horizontal section taken along line 3—3 of FIG. 2.

As a feature of the invention, a beam or safety barrier 24 extends across the lower portion of the security door 15 when the door is in the closed position, as shown in FIG. 1. Barrier 24 is connected to the frame 17 of the lowermost panel 16 through a pair of brackets 25, as shown in FIG. 3.

A handle 26 is mounted on the central portion of barrier 24 and can be grasped by an operator in order to move the security door between the closed and open positions.

Figure 2:
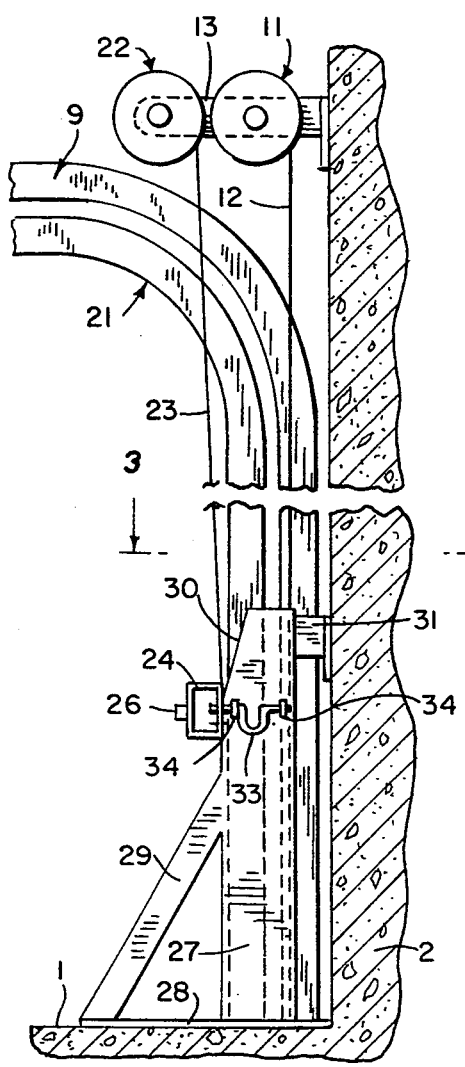
FIG. 2 is a vertical section showing the security door.

Mounted on floor 1 on either side of doorway 4 are fixed columns or supports 27. The lower end of each column is mounted on a base plate 28 that is anchored to floor 1 and a diagonal brace 29 extends between the base plate and the central portion of column 27. The upper edge of each column is provided with an inclined guiding surface 30, as best shown in FIG. 2, while the upper end of the column is supported by a bracket 31, which is mounted to wall 2.

When door 15 is in the closed position, the ends of barrier 24 will be located inwardly and slightly out of contact with the respective columns 27. If barrier 24 is subjected to a force or impact, such as for example a forklift truck maneuvering on floor 1 and accidentally contacting the barrier, the barrier will engage the columns 27 to prevent the forklift truck from accidentally moving through the doorway 4 and falling to the driveway. The tolerance or spacing between barrier 24 and columns 27 is less than the tolerance between rollers 20 and the sides of tracks 21 so that the external force will move the barrier 24 into contact with columns 27 before the rollers move inwardly to engage the sides of the tracks, thus preventing damage or deformation to the rollers and track.

Security door 15 can be locked in the closed position by any convenient locking mechanism. As shown in the drawings, the locking mechanism comprises a slide bolt 33 which is slidable within a pair of loops 34 mounted on the side of column 27. The inner end of slide bolt 33 is received within a hole in barrier 24 to lock the security door in the closed position. It is contemplated that a more positive lock, such as a padlock or the like, can be incorporated if desired to maintain the door in the closed position.

While the drawings show the security door 15 being composed of a series of hinged panels 16 and movable to an open position beneath ceiling 3, it is contemplated that in some installations where there is sufficient headspace in the building the door 15 may move vertically and be stored in the open position along wall 2 above doorway 4. In this case, the hinged panels or section 16 would not be required.

Similarly, while the drawings show the security door mounted on the inside of the building, it is contemplated that the door could also be mounted for movement on tracks located on the exterior of the loading dock wall 2.

The open construction of the door permits light to enter the loading dock or building and also improves the ventilation.

The safety barrier or beam 24 is connected integrally with the security door and when the door is in the closed position, the barrier will prevent equipment, as well as personnel, from accidentally falling through the doorway to the driveway below.

The door 15 can be locked in the closed position, thus preventing pilferage from the dock and preventing unauthorized personnel or articles from entering the dock.

Various modes of carrying out the invention are contemplated as being within the scope of the following claims, particularly pointing out and distinctly claiming the subject matter which is regarded as the invention.

I claim:

1. A security door construction for a doorway in a loading dock, comprising a door composed at least in part of a material permeable to light and/or air, a track on the loading dock adjacent the doorway, mounting means for mounting the door for movement on the track between a closed position where the door encloses the doorway to an open position, a safety beam connected to the lower portion of the door and extending across the width of the doorway, and fixed support means on the loading dock and disposed to be engaged by the beam to prevent lateral deflection of the door by an external force.

2. The door construction of claim 1, wherein said material is a metal having a plurality of openings.

3. The door construction of claim 2, wherein said metal comprises metal mesh.

4. The door construction of claim 1, wherein said door includes a plurality of hinged sections, each section having a peripheral frame enclosing a central section, said central section composed of said material, said track comprising a pair of general L-shaped track sections, each track section including a vertical section disposed along the side of the doorway and a horizontal section connected to the upper end of each vertical section and extending inwardly of said dock.

5. The door construction of claim 4, wherein said mounted means comprises a plurality of rollers connected to the side edges of each door section, said rollers being disposed to ride on the respective track sections.

6. The door construction of claim 1, wherein the ends of said beam project laterally beyond the sides of said door.

7. The door construction of claim 6, wherein said support means comprises a pair of fixed posts each mounted adjacent a side of said doorway, the ends of said beam when said door is in the closed position being located inwardly of the respective posts.

8. The door construction of claim 7, and including locking means for locking said door in the closed position.

9. A security door construction for a doorway in a loading dock, comprising a door composed at least in part of an open material, a track mounted on the loading dock adjacent each side of the doorway, a plurality of rollers mounted on each side edge of the door and disposed to ride on the respective track, said door being movable between a closed position where said door encloses said doorway to an open position, a safety beam connected to the lower portion of the door and extending across the width of said door, and a pair of fixed supports mounted on the loading dock adjacent each side of the doorway, the ends of said beam being located inwardly of the respective supports when said door is in the closed position, whereby a force applied to said beam will move said beam into engagement with said supports to prevent deformation of said door.

10. The door construction of claim 9, wherein each track is generally U-shaped in cross section and includes a pair of spaced side portions and a central web connecting said side portions, the spacing between the beam and the supports when said door is in the closed position being less than the spacing between the rollers and the side portions so that said force will move the beam into engagement with said supports before said rollers engage said side portions.

11. The door construction of claim 9, and including locking means for locking the door in the closed position.

12. In combination, a loading dock including a vertical wall having a doorway, a first door formed of an impervious material, first track means mounted on each side of said doorway, first mounting means for mounting said first door for movement on said first track means between a closed position where said first door encloses said opening to an open position, a security door formed at least in part of an open material, second track means mounted adjacent each side of said doorway, second mounting means for mounting said security door for movement on said second track means between a closed position where said security door encloses said doorway in an open position, a barrier secured to the lower portion of said security door and extending across the width of said security door, and a pair of fixed supports mounted on the loading dock adjacent each side of the doorway, the ends of said barrier being disposed inwardly of said respective supports when the security door is in the closed position.

13. The combination of claim 12, wherein said first track means is located between said vertical wall and said second track means.

14. The combination of claim 13, wherein said first track means is parallel to said second track means.

15. The construction of claim 4, wherein each door section includes a generally rectangular frame and a sheet of metal of open texture is mounted within said rectangular frame.

* * * * *